United States Patent
Glanz et al.

(10) Patent No.: US 10,906,005 B2
(45) Date of Patent: Feb. 2, 2021

(54) METHOD FOR PERMEATE FLOW PATH SANITIZATION IN A REVERSE OSMOSIS SYSTEM

(71) Applicant: ECOLAB USA INC., St. Paul, MN (US)

(72) Inventors: Douglas P. Glanz, Cincinnati, OH (US); Randall Majerle, St. Paul, MN (US); Jason Van't Hul, Harrisburg, SD (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 16/252,123

(22) Filed: Jan. 18, 2019

(65) Prior Publication Data

US 2019/0224627 A1    Jul. 25, 2019

Related U.S. Application Data

(60) Provisional application No. 62/620,235, filed on Jan. 22, 2018.

(51) Int. Cl.
| | | |
|---|---|---|
| *B01D 65/02* | (2006.01) | |
| *B01D 61/10* | (2006.01) | |
| *B01D 61/02* | (2006.01) | |
| *B01D 71/16* | (2006.01) | |
| *C02F 1/76* | (2006.01) | |
| *C02F 1/66* | (2006.01) | |
| *B01D 71/56* | (2006.01) | |
| *C02F 1/44* | (2006.01) | |
| *C02F 103/32* | (2006.01) | |

(52) U.S. Cl.
CPC ......... *B01D 65/027* (2013.01); *B01D 61/025* (2013.01); *B01D 61/10* (2013.01); *B01D 65/02* (2013.01); *B01D 65/022* (2013.01); *B01D 71/16* (2013.01); *C02F 1/76* (2013.01); *B01D 71/56* (2013.01); *B01D 2311/06* (2013.01); *B01D 2311/14* (2013.01); *B01D 2315/20* (2013.01); *B01D 2321/16* (2013.01); *B01D 2321/162* (2013.01); *B01D 2321/164* (2013.01); *C02F 1/441* (2013.01); *C02F 1/66* (2013.01); *C02F 1/766* (2013.01); *C02F 2103/32* (2013.01); *C02F 2209/03* (2013.01); *C02F 2303/04* (2013.01); *C02F 2305/04* (2013.01)

(58) Field of Classification Search
None
See application file for complete search history.

(56) References Cited

U.S. PATENT DOCUMENTS

| | | | | |
|---|---|---|---|---|
| 4,309,287 A | * | 1/1982 | Roos | B01D 61/10 210/247 |
| 5,096,589 A | * | 3/1992 | Blind | C02F 1/441 210/638 |
| 6,416,668 B1 | * | 7/2002 | Al-Samadi | B01D 61/04 210/636 |
| 2004/0203088 A1 | * | 10/2004 | Ho | C12Q 1/04 435/34 |
| 2006/0032823 A1 | | 2/2006 | Harrison et al. | |
| 2006/0124517 A1 | * | 6/2006 | Scaringe | B01D 61/08 210/137 |
| 2009/0050563 A1 | * | 2/2009 | Ruehr | B01D 65/02 210/636 |
| 2013/0220924 A1 | | 8/2013 | Maeda | |
| 2013/0344533 A1 | | 12/2013 | Kotzer et al. | |
| 2016/0002411 A1 | | 1/2016 | Menozzi et al. | |
| 2016/0271565 A1 | | 9/2016 | Liu et al. | |
| 2017/0120311 A1 | | 5/2017 | Timmons et al. | |

FOREIGN PATENT DOCUMENTS

| | | | | |
|---|---|---|---|---|
| CN | 106145434 | | 11/2016 | |
| EP | 1174177 A2 | | 1/2002 | |
| JP | 2001079366 | | 3/2001 | |
| WO | WO2009128328 | | 10/2009 | |
| WO | WO 2016201060 | | 12/2016 | |
| WO | WO-2016201060 A1 | * | 12/2016 | B01D 61/04 |

OTHER PUBLICATIONS

EPA: Membrane Separation, pp. 1-5, accessed online on Dec. 3, 2019 at https://iaspub.epa.gov/tdb/pages/treatment/treatmentOverview.do?treatmentProcessId=-2103528007 (Year: 2019).*
CDC: Drinking Water, pp. 1-4, 2014, accessed at https://www.cdc.gov/healthywater/drinking/public/chlorine-disinfection.html on Dec. 3, 2019 (Year: 2014).*
PCT International Search Report and Written Opinion for PCT/US2019/014213, dated Mar. 29, 2019, 17 pages.
Lopez-Ramirez, J.A. et al., "Pre-treatment optimisation studies for secondary effluent reclamation with reverse osmosis" Water Research (2003) 37: 1177-1184.
Tin, Moe Ma Ma et al., "Membrane fouling, chemical cleaning and separation performance assessment of a chlorine-resistant nanofiltration membrane for water recycling applications" Separation and Purification Technology (2017) 189: 170-175.

\* cited by examiner

*Primary Examiner* — Clare M Perrin
(74) *Attorney, Agent, or Firm* — Eric D. Babych; Barnes & Thornburg LLP

(57) ABSTRACT

The disclosure pertains to sanitizing the permeate flow path of a reverse osmosis system. A method of sanitizing a filtration system is disclosed that can include injecting a biocide into a permeate compartment of an operating reverse osmosis system. The method can also include maintaining pressure in a concentrate compartment of the reverse osmosis system simultaneously while injecting the biocide.

16 Claims, No Drawings

METHOD FOR PERMEATE FLOW PATH SANITIZATION IN A REVERSE OSMOSIS SYSTEM

BACKGROUND

1. Field of the Invention

The present disclosure generally relates to sanitization. More particularly, the disclosure pertains to sanitizing the permeate flow path of a reverse osmosis system.

2. Description of the Related Art

A reverse osmosis system uses pressure to drive water through a semipermeable membrane. As the pure water passes through the salt rejecting layer of the membrane, the retained water becomes enriched in contaminants. Reverse osmosis systems can experience microbiological fouling of the permeate side of the system, which can be extremely difficult to remedy. Prior art remedies require complete disassembly of the permeate manifolds and downstream piping, which can be difficult and time-consuming to clean.

Removing microbiological fouling in beverage industries presents certain challenges, because non-oxidizing biocides cannot be used in the beverage market due to lack of NSF Std. 60 certification and are rejected by the membrane during the clean in place (CIP) process. Also, oxidizing biocides, such as sodium hypochlorite, oxidize polyamide membranes and cannot be used, due to membrane compatibility issues. A significant operating cost factor of a reverse osmosis system is the cost of the membranes themselves. Other anti-microbial agents, such as peroxyacetic acid and other mild oxidants present some risk, but are rejected by the reverse osmosis membrane and are difficult to get to the permeate side of the membrane system.

BRIEF SUMMARY

In some embodiments, a method of sanitizing a filtration system is disclosed. The method can include injecting a biocide into a permeate compartment of an operating reverse osmosis system.

In some embodiments, the method can include maintaining pressure in a concentrate compartment of the reverse osmosis system simultaneously while injecting the biocide.

In some embodiments, the pressure can be from about 50 psi to about 1500 psi.

In some embodiments, the method can include feeding water into a concentrate compartment of the reverse osmosis system, the reverse osmosis system can include a membrane dividing the concentrate compartment and the permeate compartment, and allowing water to pass through the membrane to the permeate compartment.

In some embodiments, the biocide can be an oxidizing agent.

In some embodiments, the biocide can be sodium hypochlorite, sodium percarbonate, stabilized bromine, an oxidizing halogen, calcium hypochlorite, hypochlorous acid, an acid, a base, or any combination thereof.

In some embodiments, the biocide can be sodium hypochlorite.

In some embodiments, the biocide can be injected into the permeate compartment at a dosage of about 0.001 ppm to about 3000 ppm.

In some embodiments, the biocide can be injected into the permeate compartment at a dosage of about 0.001 ppm to about 100 ppm.

In some embodiments, the reverse osmosis system can include a membrane selected from: a polyamide membrane and a cellulose acetate membrane.

In some embodiments, the reverse osmosis system can include a polyamide membrane.

In some embodiments, the biocide can be injected intermittently.

In some embodiments, the biocide can be injected into the permeate compartment via a permeate port.

In some embodiments, the method can include injecting a surfactant with the biocide.

In some embodiments, the method can include injecting a detergent with the biocide.

In some embodiments, a method of treating water is disclosed. The method can include feeding water into a concentrate compartment of a reverse osmosis system, the reverse osmosis system can include a membrane dividing the concentrate compartment and a permeate compartment; pressurizing the water in the concentrate compartment; and injecting a biocide into the permeate compartment.

In some embodiments, the biocide can be sodium hypochlorite, calcium hypochlorite, hypochlorous acid, or any combination thereof.

In some embodiments, the method can include feeding the water from the permeate compartment into a food and beverage process.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

DETAILED DESCRIPTION

Various embodiments are described below. The relationship and functioning of the various elements of the embodiments may better be understood by reference to the following detailed description. However, embodiments are not limited to those explicitly described below. In certain instances, details may have been omitted that are not necessary for an understanding of embodiments disclosed herein.

In some embodiments, a method of sanitizing a filtration system is disclosed. The method may include injecting a biocide into a permeate compartment of an operating reverse osmosis system. An operating reverse osmosis system refers to a reverse osmosis system that is filtering water by passing water from the concentrate compartment through the membrane and into the permeate compartment.

This method uses the permeate ports on the end of the reverse osmosis system opposite of the permeate manifold that may be plugged with either ¾" or 1" pipe plugs. Each pipe plug can be replaced with a bushing to install either an injection quill or quick-connect fitting to admit biocide during machine operation on a routine basis to sanitize the entire permeate flow path.

In some embodiments, the method may include maintaining pressure in a concentrate compartment of the reverse osmosis system simultaneously while injecting the biocide.

The injection of the biocide may both start and stop while the concentrate compartment of the reverse osmosis system is under pressure. Without being bound by any particular theory, it is believed that the pressure in the system prevents the biocide from flowing backwards into the membrane material, where it would cause damage.

The pressure in the concentrate compartment of the reverse osmosis system can be from about 50 psi to about 1500 psi. In some embodiments, the pressure can be from about 100 psi to about 250 psi or about 600 psi to about 1200 psi.

The pressure in the permeate compartment of the reverse osmosis system can be from about 10 psi to about 45 psi. In some embodiments, the pressure in the permeate compartment can be from about 10 psi to about 30 psi, about 10 psi to about 20 psi, about 12 psi to about 40 psi, about 12 psi to about 30 psi, or about 10 psi to about 15 psi.

In some embodiments, the method can include feeding water into a concentrate compartment of the reverse osmosis system and allowing water to pass through the membrane to the permeate compartment. The reverse osmosis system can comprise a membrane dividing the concentrate compartment and the permeate compartment.

Typically, a reverse osmosis system can include an inlet through which the water to be purified is fed. The inlet is in fluid communication with a concentrate compartment that is under pressure. The pressure is selected to be higher than the osmotic pressure of the inlet water to induce water migration across a membrane that separates the concentrate compartment from the permeate compartment. The purified water in the permeate compartment flows out of the system through a permeate line. Many reverse osmosis systems have auxiliary permeate ports that are plugged.

In some embodiments, the biocide can be injected into the permeate compartment via a permeate port.

In some embodiments, the biocide can be injected intermittently. Depending on the degree or susceptibility of biological contamination of the system, the dosage and the dosage timing can be adjusted to reduce or prevent biological fouling.

In some embodiments, the biocide can be sodium hypochlorite, sodium percarbonate, stabilized bromine, an oxidizing halogen, calcium hypochlorite, hypochlorous acid, an acid, a base, or any combination thereof.

In some embodiments, the biocide can be an oxidizing agent. For example, the oxidizing agent can be hydrogen peroxide, sodium hypochlorite, chlorine dioxide, ozone, sodium hypobromite, sodium or potassium permanganate, potassium peroxymono sulfate, peroxy salts of alkali earth metals, and any combination thereof. In some embodiments, the oxidizing agent can be selected from hydrogen peroxide, sodium hypochlorite, chlorine dioxide, or any combination thereof. In some embodiments, the biocide can be sodium hypochlorite. In some embodiments, the oxidizing agent can be hydrogen peroxide.

In some embodiments, the biocide may be a stabilized halogen precursor, such as for example Towerbrom®, which is a halogenated isocyanurate that generates bromine.

In some embodiments, the oxidizing agent, such as hydrogen peroxide may be in a non-stabilized form and/or may exclude a stabilizing agent. Non-limiting examples of stabilizing agents include, but are not limited to, sodium stannate, sodium pyrophosphate, organophosphonates, nitrate, or colloidal silicate.

The biocide can comprise an acid such as, for example, hydrochloric acid, sulfuric acid, sulfamic acid, oxalic acid, citric acid, or any combination thereof. In some embodiments, the acid can be hydrochloric acid.

The biocide can be injected into the permeate compartment at a dosage of about 0.001 ppm to about 3000 ppm. In some embodiments, the biocide can be injected into the permeate compartment at a dosage of about 0.1 ppm to about 1000 ppm, about 1 ppm to about 500 ppm, about 10 ppm to about 300 ppm, or about 10 ppm to about 200 ppm. In some embodiments, the biocide can be injected into the permeate compartment at a dosage of about 0.001 ppm to about 100 ppm.

The reverse osmosis system can include a membrane selected from a polyamide membrane and a cellulose acetate membrane. In some embodiments, the reverse osmosis system can include a polyamide membrane. The reverse osmosis system can have any membrane material that would be damaged in the presence of oxidizing biocides.

In some embodiments, the method can include injecting a surfactant with the biocide. In some embodiments, the surfactant may be non-ionic, ionic, or zwitterionic. Suitable surfactants include, but are not limited to, anionic surfactants, cationic surfactants, nonionic surfactants, and combinations thereof. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates, and combinations thereof. Cationic surfactants include alkyl trimethyl quaternary ammonium salts, alkyl dimethyl benzyl quaternary ammonium salts, dialkyl dimethyl quaternary ammonium salts, imidazolinium salts, and combinations thereof. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters, and combinations thereof. Also included are betaines and sultanes, amphoteric surfactants such as alkyl amphoacetates and amphodiacetates, alkyl amphopripionates and amphodipropionates, alkyliminodiproprionate, and combinations thereof.

In some embodiments, the surfactant may be non-ionic. In some embodiments, the surfactant may include a $C_6$-$C_{18}$ alkyl polyglycoside. In some embodiments, the surfactant may include a $C_8$-$C_{10}$ alkyl polyglycoside and a $C_{10}$-$C_{18}$ alkyl polyglycoside. As used herein "alkyl polyglycoside" refers to non-ionic surfactants having an alkyl chain and a polymer of a sugar molecule. Alkyl polyglycosides are commercially available and can be produced by reaction between a sugar and fatty alcohol over an acid catalyst.

In some embodiments, the method can include injecting a detergent with the biocide. Non-limiting examples of detergents include anionic, cationic, non-ionic, and zwitterionic detergents. For example, an anionic detergent can be a linear or branched alkylbenzenesulfonate, such as sodium dodecylbenzenesulfonate. Examples of non-ionic detergents include, but are not limited to, polyoxyethylenes or glycosides, such as Tween or Triton.

In some embodiments, the method can include adding a reducing agent such as sodium thiosulfate or sodium hydrogen sulfite into the concentrate compartment or the permeate compartment. The reducing agent can react with the oxidizing biocide and provide further protection of the reverse osmosis membrane. In other embodiments, a reducing agent such as sodium thiosulfate or sodium hydrogen sulfite is not added to the concentrate compartment or the permeate compartment.

In other embodiments, a method of treating water is disclosed. The method can include feeding water into a concentrate compartment of a reverse osmosis system. The reverse osmosis system can have a membrane dividing the concentrate compartment and a permeate compartment. The method can also include pressurizing the water in the concentrate compartment and injecting a biocide into the permeate compartment.

In some embodiments, the method can include feeding the water from the permeate compartment into a food and beverage process.

In some embodiments, the solution injected into the permeate compartment may have a pH of about 0 to about 7. The solution can include the biocide. In some embodiments, the composition may have a pH of about 0 to about 7, about 0 to about 6, about 0 to about 5, about 0.25 to about 6, about 0.25 to about 5.5, about 0.25 to about 5, about 0.25 to about 4.5, about 0.25 to about 4, about 0.25 to about 3.5, about 0.25 to about 3, about 0.25 to about 2.5, about 0.25 to about 2, about 0.25 to about 1.5, about 0.25 to about 1, about 2 to about 4, about 2.5 to about 3.5, about 3 to about 4.5, about 3.5 to about 4.5, about 1 to about 5, about 1 to about 4, or about 1 to about 3.

The methods disclosed herein can be used to sanitize any reverse osmosis system, especially any system at a food and beverage facility that uses water produced from the reverse osmosis system as ingredient water.

EXAMPLES

A low-pressure membrane was selected to simulate the final elements in a reverse osmosis system that may be operating at low feed pressure. A reverse osmosis system under low pressure would be most susceptible to backflow.

The tests were performed on a single element of a reverse osmosis unit that included the following in the order of the flow path: a 5 micron filter with integral activated carbon; a Procon brass high pressure feed pump; rotameters on feed and concentrate lines; a Dow 2540-XLE polyamide reverse osmosis membrane (about 28 square feet active area); a Iwaki 24 gallons per day 100 psi diaphragm metering pump; and a John Guest ¼" quick connect fitting on the membrane vessel permeate port. All conductivity testing was done with a Myron L Ultrameter II that was calibrated prior to the test. The conductivity is reported in either μmhos units or ppm (ppm=μmhos*0.65). The rinse down time is the time it takes to return the permeate water to its original conductivity before injecting sodium hypochlorite.

This system was operated under the following conditions on city water (about 457 μmhos).

0.22 gpm (about 11.31 gallons per square foot per day flux rate)
15% recovery
55 psi feed pressure
52 psi concentrate pressure
12 psi permeate pressure
12.17 mmhos permeate conductivity Example 1

This test was done with a 0.1% sodium hypochlorite solution in the permeate compartment for a 1 minute duration to test the feed system, determine proper feed rates and test for catastrophic damage. Table 1 shows the experiment duration, conductivity measurements, and rinse down time. No membrane damage was observed after the test was completed.

TABLE 1

| Parameter | Result |
| --- | --- |
| Sodium Hypochlorite Concentration | 1,000 ppm in permeate stream |
| Duration | 1 minute |
| Permeate Conductivity at T = 0 | 12.06 μmhos |
| Permeate Conductivity at T = 1 minute | 1,000 ppm |
| Rinse down time after Sodium Hypochlorite pump turned off | 3 minutes |
| Permeate Conductivity after rinse down | 11.9 μmhos |

Example 2

A test was done with a 0.1% sodium hypochlorite solution in the permeate compartment for a 10 minute duration. Table 2 shows the experiment duration, conductivity measurements, and rinse down time. No membrane damage was observed after the test was completed.

TABLE 2

| Parameter | Result |
| --- | --- |
| Sodium Hypochlorite Concentration | 1,000 ppm in permeate stream |
| Duration | 10 minutes |
| Permeate Conductivity at T = 0 | 11.76 μmhos |
| Permeate Conductivity from T = 0 to T = 10 minutes | 1,000 ppm |
| Number of times permeate conductivity verified during test | 3 |
| Rinse down time after Sodium Hypochlorite pump turned off | 3 minutes |
| Permeate Conductivity after rinse down | 11.34 μmhos |

Example 3

A test was done with a 0.2% sodium hypochlorite solution in the permeate compartment for a 30 minute duration. Table 3 shows the experiment duration, conductivity measurements, and rinse down time. No membrane damage was observed after the test was completed. The time to rinse down was far longer than expected.

TABLE 3

| Parameter | Result |
| --- | --- |
| Sodium Hypochlorite Concentration | 2,000 ppm in permeate stream |
| Duration | 30 minutes |
| Permeate Conductivity at T = 0 | 11.58 μmhos |
| Permeate Conductivity from T = 0 to T = 10 minutes | 1,400 ppm |
| Permeate Conductivity from T = 10 to T = 30 minutes | 2,300 ppm |
| Number of times permeate conductivity verified during test | 10 |
| Rinse down time after Sodium Hypochlorite pump turned off | 32 minutes |
| Permeate Conductivity after rinse down | 10.38 μmhos |

Example 4

A test was done with a 0.2% sodium hypochlorite solution in the permeate tube for a 60 minute duration. Table 4 shows the experiment duration, conductivity measurements, and rinse down time. No membrane damage was observed after the test was completed. The time to rinse down was far longer than expected. The 5 inch long dead leg to the permeate pressure gauge was suspected to be the problem. During the long duration, high-conductivity test, this dead leg will fill with the high conductivity water by diffusion. This water may have been metered out at a very slow rate during the rinse down. A tee and a valve was added so that the permeate could rinse through this dead leg in an effort to reduce the rinse down time.

TABLE 4

| Parameter | Result |
| --- | --- |
| Sodium Hypochlorite Concentration | 2,000 ppm in permeate stream |
| Duration | 60 minutes |
| Permeate Conductivity at T = 0 | 10.81 μmhos |
| Permeate Conductivity from T = 0 to T = 60 minutes | 2,100 ppm |
| Number of times permeate conductivity verified during test | 10 |
| Rinse down time after Sodium Hypochlorite pump turned off | 50 minutes |
| Permeate Conductivity after rinse down | 10.44 μmhos |

Example 5

A test was done with a 0.2% sodium hypochlorite solution in the permeate compartment for a 60 minute duration. Table 5 shows the experiment duration, conductivity measurements, and rinse down time. No membrane damage was observed after the test was completed. The rinse down time was substantially reduced as a result of the plumbing change allowing the system to rinse down through the pressure gauge plumbing.

TABLE 5

| Parameter | Result |
| --- | --- |
| Sodium Hypochlorite Concentration | 2,000 ppm in permeate stream |
| Duration | 60 minutes |
| Permeate Conductivity at T = 0 | 10.44 μmhos |
| Permeate Conductivity from T = 0 to T = 60 minutes | 2,160 ppm |
| Number of times permeate conductivity verified during test | 8 |
| Rinse down time after Sodium Hypochlorite pump turned off | 3 minutes |
| Permeate Conductivity after rinse down | 9.42 μmhos |

Example 6

This challenge was done with a 0.2% sodium hypochlorite solution, plus the addition of a 0.6% solution of Reeva dish soap in the permeate tube for a 60 minute duration. Table 6 shows the experiment duration, conductivity measurements, and rinse down time. No membrane damage was observed after the test was completed.

TABLE 6

| Parameter | Result |
| --- | --- |
| Sodium Hypochlorite Concentration | 2,000 ppm in permeate stream |
| Duration | 60 minutes |
| Permeate Conductivity at T = 0 | 9.22 μmhos |
| Permeate Conductivity from T = 0 to T = 60 minutes | 2,170 ppm |
| Number of times permeate conductivity verified during test | 5 |
| Rinse down time after Sodium Hypochlorite pump turned off | 4 minutes |
| Permeate Conductivity after rinse down | 9.07 μmhos |

Example 7

A test was done with a 0.4% sodium hypochlorite solution in the permeate tube for a 60 minute duration. For this test, the feed was switched from diluted sodium hypochlorite Solution (2.75 wt %) to full strength sodium hypochlorite (8.25 wt %). Table 7 shows the experiment duration, conductivity measurements, and rinse down time. No membrane damage was observed after the test was completed.

TABLE 7

| Parameter | Result |
| --- | --- |
| Sodium Hypochlorite Concentration | 4,000 ppm in permeate stream |
| Duration | 60 minutes |
| Permeate Conductivity at T = 0 | 9.80 μmhos |
| Permeate Conductivity from T = 0 to T = 30 minutes | 4,300 ppm |
| Permeate Conductivity from T = 30 to T = 60 minutes | 5,600 ppm |
| Number of times permeate conductivity verified during test | 12 |
| Rinse down time after Sodium Hypochlorite pump turned off | 11 minutes |
| Permeate Conductivity after rinse down | 9.63 μmhos |

These tests proved that it is possible to inject high concentrations of non-membrane compatible products into the permeate port of a reverse osmosis system, provided that the product feed is started and stopped while the reverse osmosis system is in operation. This system was fed with the equivalent of 13,000 ppm*hours of sodium hypochlorite over a five-hour period. Membrane manufacturers expect a doubling of salt passage after 1,000 ppm*hours of exposure. If any sodium hypochlorite was exposed to the membrane, a corresponding increase in salt passage would have been observed. Table 8 shows that the reverse osmosis system did not experience any negative impacts due to injecting sodium hypochlorite into the permeate compartment.

TABLE 8

| Parameter | Before Testing | After Testing |
| --- | --- | --- |
| Permeate Flow | 0.22 gpm | 0.22 gpm |
| Recovery | 15% | 15% |
| Feed Pressure | 55 psi | 55 psi |
| Concentrate Pressure | 53 psi | 53 psi |
| Permeate Pressure | 12 psi | 12 psi |
| Permeate Conductivity | 12.17 μmhos | 9.63 μmhos |

Any composition disclosed herein may comprise, consist of, or consist essentially of any of the compounds/components disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

As used herein, the term "about" refers to the cited value being within the errors arising from the standard deviation found in their respective testing measurements, and if those errors cannot be determined, then "about" refers to within 10% of the cited value.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a biocide" is intended to include "at least one biocide" or "one or more biocides."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of sanitizing a filtration system, comprising:
   feeding water into a concentrate compartment of an operating reverse osmosis unit;
   injecting a biocide into a permeate compartment of the operating reverse osmosis unit, the operating reverse osmosis unit comprising a membrane dividing the concentrate compartment and the permeate compartment, and
   allowing the water to pass through the membrane into the permeate compartment, wherein the biocide is sodium hypochlorite, sodium percarbonate, stabilized bromine, an oxidizing halogen, calcium hypochlorite, hypochlorous acid, or any combination thereof.

2. The method of claim 1, further comprising maintaining pressure in the concentrate compartment of the operating reverse osmosis unit simultaneously while injecting the biocide.

3. The method of claim 2, wherein the pressure is from about 50 psi to about 1500 psi.

4. The method of claim 1, wherein the biocide is sodium hypochlorite.

5. The method of claim 1, wherein the biocide is injected into the permeate compartment at a dosage of about 0.001 ppm to about 3000 ppm.

6. The method of claim 1, wherein the biocide is injected into the permeate compartment at a dosage of about 0.001 ppm to about 100 ppm.

7. The method of claim 1, wherein the operating reverse osmosis unit comprises a membrane selected from: a polyamide membrane and a cellulose acetate membrane.

8. The method of claim 1, wherein the biocide is injected intermittently.

9. The method of claim 1, wherein the biocide is injected into the permeate compartment via a permeate port.

10. The method of claim 1, further comprising injecting a surfactant with the biocide.

11. The method of claim 1, further comprising injecting a detergent with the biocide.

12. The method of claim 1, further comprising feeding the water from the permeate compartment into a food and beverage process.

13. A method of treating water, comprising:
    feeding water into a concentrate compartment of an operating reverse osmosis unit, the operating reverse osmosis unit comprising a membrane dividing the concentrate compartment and a permeate compartment;
    pressurizing the water in the concentrate compartment; and
    injecting a biocide into the permeate compartment,
    wherein the biocide is sodium hypochlorite, calcium hypochlorite, hypochlorous acid, or any combination thereof.

14. The method of claim 13, wherein the biocide is injected into the permeate compartment at a dosage of about 0.001 ppm to about 3000 ppm.

15. The method of claim 13, wherein the membrane is a polyamide membrane.

16. The method of claim 13, further comprising feeding the water from the permeate compartment into a food and beverage process.

* * * * *